June 4, 1968 T. R. PETERS 3,387,281

INFORMATION STORAGE ARRANGEMENT EMPLOYING CIRCULATING MEMORIES

Filed Nov. 12, 1965 3 Sheets-Sheet 1

INVENTOR
T. R. PETERS
BY Kenneth B Hamlin
ATTORNEY

INFORMATION STORAGE ARRANGEMENT EMPLOYING CIRCULATING MEMORIES

Filed Nov. 12, 1965 3 Sheets-Sheet 3

$D = m\bar{n}o + z\bar{n}o\bar{g}\bar{h}$ $E = mn\bar{o} + z\bar{o}\bar{g}\bar{h}$ $F = no + zo\bar{g}\bar{h}$ $A = \bar{g}h\bar{m} + zg\bar{h}\bar{m}$ $B = (g\bar{h})'m + zm$ $C = \bar{g}hm + zg\bar{h}m$ United States Patent Office 3,387,281
Patented June 4, 1968

3,387,281

INFORMATION STORAGE ARRANGEMENT EMPLOYING CIRCULATING MEMORIES

Theodore R. Peters, Flanders, N.J., assignor to Bell Telephone Laboratories, Incorporated, New York, N.Y., a corporation of New York Filed Nov. 12, 1965, Ser. No. 507,447
19 Claims. (Cl. 340—172.5)

This invention relates to data processing arrangements and, more specifically, to a data storage organization for closely packing digital information in a circulating memory.

Memories used in data processing systems may be divided into three classes, according to their respective access properties. In a random access memory, storage locations can be interrogated in any order, with each readout requiring an equal time interval. Magnetic cores, thin ferromagnetic films and twister wires comprise illustrative storage elements for random access memories.

In addition, there are two data circulating memories, viz., periodic access and sequential access arrangements. In the periodic access configuration, access time to any memory location is variable, depending upon the time interval since the location was last available for data outputting. Correspondingly, in a sequential access store, a readout from successive or adjacent memory locations is the only interrogation desired, with each readout taking an equal time period. Rotating magnetic drums or discs, and recirculating delay lines are examples of recirculating memories.

When digital information is supplied on an asynchronous basis for storage to, or read out from what is functionally a recirculating memory, prior art arrangements have heretofore embodied such recirculating operational structures with typical random access memory configurations, and utilized these devices in a restrictive way, e.g., accessed by binary counters to sequentially interrogate contiguous storage locations. Since random access memory structures are considerably more expensive per bit of storage than recirculating organizations, typically by an order of magnitude, and also characterized by a relatively slower access time, such prior art arrangements have been found seriously deficient.

It is therefore an object of the present invention to provide an improved digital storage arrangement.

More specifically, it is an object of the present invention to provide a relatively inexpensive recirculating memory which may advantageously receive data from, or supply data to asynchronously operated circuit elements.

It is another object of the present invention to provide a relatively inexpensive sequential memory organization which exhibits a relatively fast access time.

These and other objects of the present invention are realized in a specific illustrative storage organization for closely packing asynchronously supplied input data in a sequential access memory. The arrangement comprises a plurality of cascaded periodic memory stages of different periodicities to connect a data input source to the sequential memory. An integral or common multiple relationship characterizes the relative capacities of the memories, such that each storage arrangement is sequentially enabled to fill the next larger stage.

In addition, the above-described arrangement in inverted form may be employed to provide an interface between a sequential access memory and an asynchronous data output element.

It is thus a feature of the present invention that a recirculating information storage arrangement comprise a principal recirculating memory and a plurality of synchronized periodic memory stages cascaded therewith.

It is another feature of the present invention that a recirculating information storage arrangement comprise an asynchronous data source, a circulating memory characterized by a capacity of $m$ bits, and a plurality of cascaded intermediate storage stages connecting the source and the circulating memory, with each of the intermediate storage stages comprising a plurality of like periodic memories of capacity $m/n$, where $m$, $n$ and $m/n$ are positive integers.

A complete understanding of the present invention and of the above and other features, advantages and variations thereof may be gained from a consideration of the following detailed description of an illustrative embodiment thereof presented hereinbelow in conjunction with the accompanying drawing, in which.

Figure 1:
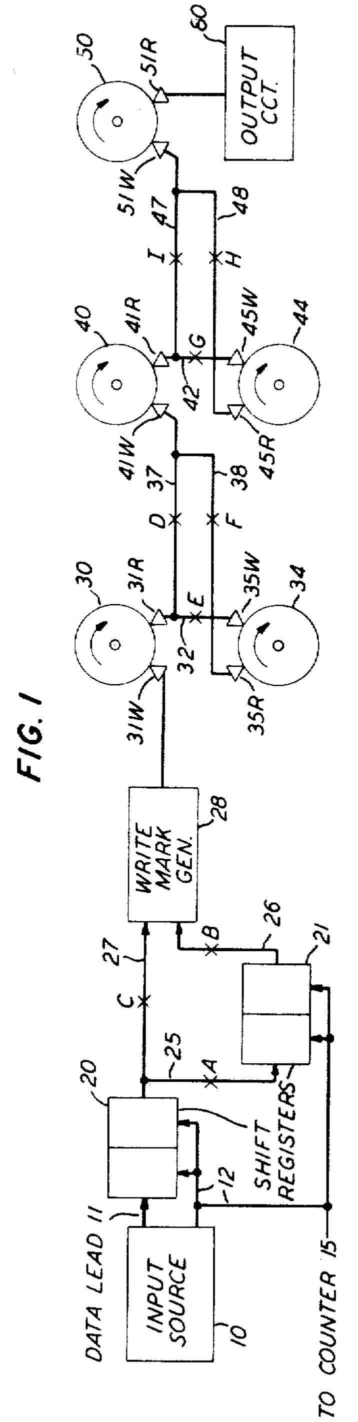
FIG. 1 is a schematic diagram depicting the data processing portion of an illustrative data storage organization which embodies the principles of the present invention.
Figure 4:
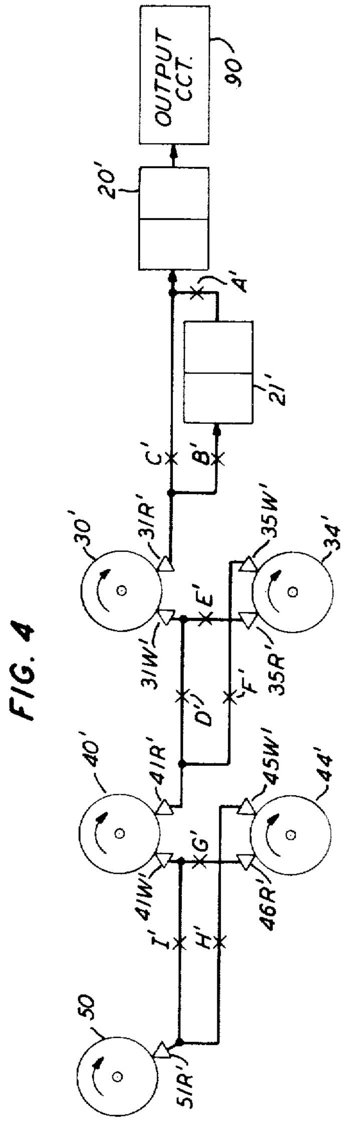
Figure 3:
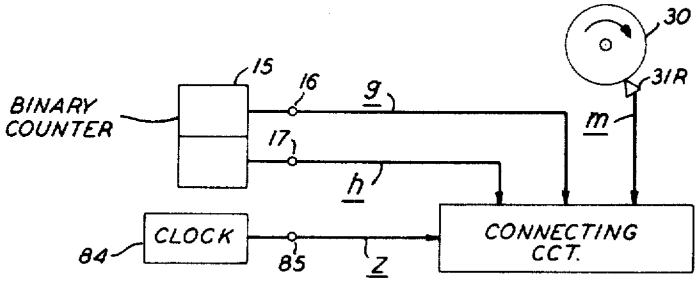

FIG. 3 illustrates the control circuitry associated with two digital registers 20 and 21 and a magnetic drum 30 shown in FIG. 1; and FIG. 4 is a diagram depicting a data outputting organization which embodies the principles of the present invention.

Referring now to FIG. 1, there is shown a specific illustrative data storage arrangement for closely packing data asynchronously supplied by an input source 10 in a circulating memory 50. Closely packing defines a mode of data storage wherein consecutive bits of information are registered in contiguous storage cells in a digital memory, e.g., in the element 50. Cascaded between the source 10 and the principal memory 50 are three intermediate data storage stages respectively comprising, from left to right, two shift registers 20 and 21, two periodic memories 30 and 34, and two additional periodic memories 40 and 44. It is noted that the memories 30, 34, 40, 44 and 50 may be embodied by any circulating storage arrangement, and will henceforth be treated as comprising rotating magnetic drums. While only one track for the drums 30, 34, 40, 44 and 50 is shown in FIG. 1, these drums include a plurality of parallel tracks including one control track, and an additional track for each bit in the digital words to be processed. Similarly, there are plural shift registers 20 and 21 in one-to-one correspondence with the bits in the input words. The multitrack nature of a typical magnetic drum, viz, the drum 30, is shown in detail in FIG. 1A.

A plurality of data writing heads 31W, 35W, 41W, 45W, and 51W, and a plurality of reading heads 31R, 35R, 41R, 45R, and 51R are respectively coupled to the drums 30, 34, 40, 44 and 50. Also, a plurality of data links 25, 26, 27, 32, 37, 38, 42, 47, and 48 are employed in the FIG. 1 arrangement to selectively connect the magnetic drums and the shift registers. In particular each data storage element in a given stage is adapted to selectively supply digital information to the upper drum in the following stage. Also, the upper memory in any stage is further selectively operable to pass data to the lower memory in the same stage. In this regard, a plurality of normally open relay contacts A through I are included in the interstage and intrastage links to control the flow of information between storage devices. The relay contacts A through I are shown in the well-known detached contact form, and are controlled by circuitry generally illustrated in FIGS. 2 and 3. It is observed that all structural items first identified in this paragraph, i.e., the writing and reading heads, the inter- and intrastage memory-connecting links, and the contacts A through I are multiply included in the instant arangement once for each parallel control and/or data track. This multiplicity of circuit elements is depicted in FIG. 1A for components associated with the drum 30.

The asynchronous input data source 10 is connected to the input of the register 20 via a data lead 11, and further connected to each stage of the registers 20 and 21 by a set of control leads 12. The leads 12 are energized by the source 10 whenever the source impresses data on the lead 11. Further, an output circuit 80 is connected to the reading head 51R coupled to the principal circulating memory 50. It is again observed that there are plural leads connecting the source 10 to the registers 20 and 21, and connecting the memory 50 to the output circuit 80 in one-to-one correspondence with the number of parallel data tracks.

Figure 1A:
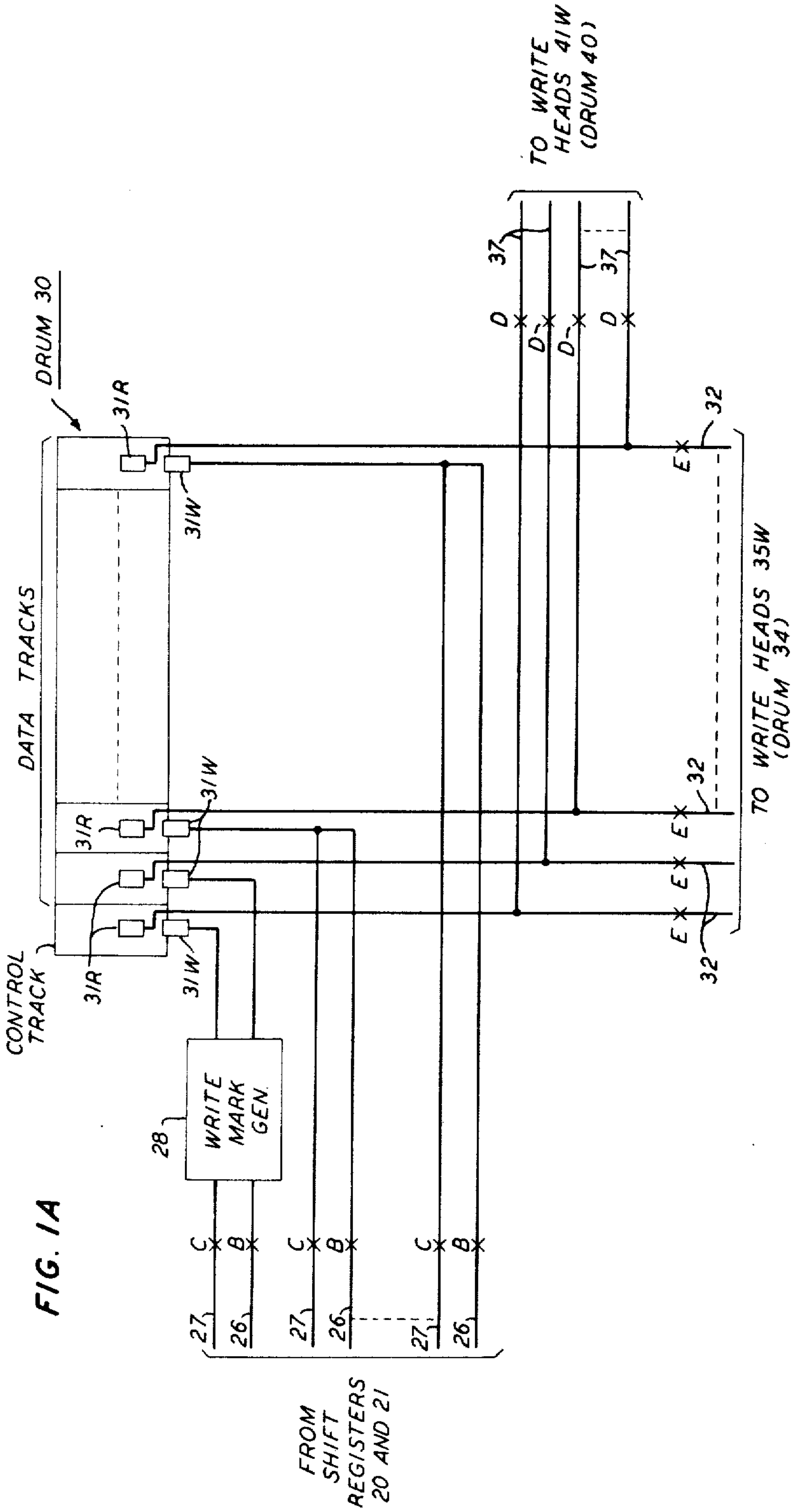
FIG. 1A is a side view of a drum 30 shown in FIG. 1 illustrating the circuitry associated therewith.

Finally, the data processing portion of the instant arrangement includes a write mark generator 28 for connecting two interstage links 26 and 27 to the drum 30, as illustrated in FIGS. 1 and 1A. The element 28 may advantageously comprise circuitry similar to that shown in A. A. Cohen et al. Patent 2,614,169 issued Oct. 14, 1952, or that disclosed in W. E. Baker et al. Patent 3,107,-344 issued Oct. 15, 1963, and is functionally adapted to place a single binary "1" digit in the control track of the drum 30 in a storage location corresponding to the first empty storage cell in the drum 30 data tracks following each data entry in the drum 30. Moreover, the generator 28 is further operable to translate data bits from the registers 20 and 21 to the first data track in the drum 30. Alternatively, the element 28 may embody a delayed pulse generator which is operable in response to a closure of the contact B or C in the lead 26 or 27.

The digital capacity of each storage stage (per parallel data track) bears an integral devisor relationship to the capacity of the principal circulating memory 50, and is dependent upon both the bit time spacing between contiguous addresses in the memory 50 and also upon the maximum input data rate for the asynchronous input source 10. For purposes of concreteness, and without any loss of generality, assume that the principal memory 50 has a capacity per track of 1028 bits with a bit spacing of 10 microseconds, i.e., one bit can be written into the memory 50 every 10 μsec. Assume further that the input source 10 supplies at most one word every 80 μsec. Accordingly, many input words are typically supplied by the source 10 before the desired, first empty storage address in the memory 50 is coupled to the associated writing head 51W. Moreover, since the input source 10 is not synchronized with the memory 50, there can be no direct data translation connection therebetween even if speed were not a factor. Hence, the intermediate storage stages are required to provide a buffering interface between the input source 10 and the memory 50.

With respect to the data capacity of the several memory devices employed in the FIG. 1 organization, assume (worst case) that the drum 50 storage cell which is to be next accessed has just passed by the writing head 51W. This address will next be coupled to the writing head 51W in $$1024\text{ words}\times\frac{10\ \mu\text{sec.}}{\text{bit}}=10.24\text{ milliseconds}\tag{1}$$

During this time, the input source 10 can supply at most one word every 80 μsec., or a total of $$10.24\text{ msec.}\times\frac{1\text{ word}}{80\ \mu\text{sec.}}=128\text{ words}\tag{2}$$

Hence, buffering must be provided for the permissible 128 words and, accordingly, each of the drums 40 and 44 is adapted to store 128 bits per track. It is observed that the ratio of the storage capacities of the memories 50 to each of the drums 40 and 44 is 1024 to 128, or 8 to 1. This comprises precisely the same ratio as the relative speed characterizing the input source 10 bears to the principal memory 50 bit spacing, i.e., 80 μsec. versus 10 μsec.

Similarly, assuming that the drum 40 has just rotated the next address to be accessed by a middle buffer stage drum past the associated writing head 41W, this desired memory cell will next be coupled to the head 41W in $$128\text{ words}\times\frac{10\ \mu\text{sec.}}{\text{bit}}=1.28\text{ msec.}\tag{3}$$

During this time interval, the input source 10 can supply at most $$1.28\text{ msec.}\times\frac{1\text{ word}}{80\ \mu\text{sec.}}=16\text{ words}\tag{4}$$

Hence, the middle stage buffering storage drums 30 and 34 each include 16 storage cells per track.

An identical analysis shows that a third or input stage of buffering is required with a capacity of $$16\text{ words}\times\frac{10\ \mu\text{sec.}}{80\ \mu\text{sec.}}=2\text{ words}\tag{5}$$

Because of this small capacity, shift register storage is more economical than a two-bit magnetic drum. Therefore, the input buffering stage comprises the two shift registers 20 and 21 each including two storage locations.

The integral capacity ratio characterizing contiguous storage stages give rise to a requirement for two storage elements (drums or shift registers) in each buffering stage. More specifically, each intermediate storage stage rotates eight times for one complete cycle of the following stage and, moreover, is selectively operable to fill one-eighth of the next following stage. Thus, when the top buffer memory of a stage is full, but the first empty one-eighth sector of the upper following stage memory is not coupled to the corresponding drum writing head, the full memory must empty its contents into its associated, like-size memory in order to accommodate information which may be directed thereto from the previous buffering stage.

The information flow between any two contiguous memory stages is regulated by the leads 25, 26, 27, 32, 37, 38, 42, 47 and 48, the contacts A through I, and the controlling arrangements of FIGS. 2 and 3, discussed hereinafter, in accordance with the following set of rules:

(1) Never read information out of any buffer memory until it is full, unless the data input cycle has ended, at which time all buffers are to be sequentially emptied;

(2) An upper storage element places its contents into the upper memory of the following stage if the first empty one-eighth sector of that drum is coupled to the associated drum writing head at the time the previous stage memory becomes full. If the following stage drum is not so oriented, write from the upper memory into the lower memory of the same stage;

(3) Empty a full lower memory into the next stage upper memory when the proper one-eighth sector of the larger memory is coupled to the associated drum writing head; and (4) After the data input cycle has ended, translate all information contained in all partially full intermediate memories in a left-to-right direction, emptying such memories in a left-to-right bottom-to-top order.

In accordance with the above rules, the FIG. 1 data storage arrangement functions in the following manner. At the inception of a data input cycle, each of the buffer registers and memories is initially empty. Moreover, the drums 30, 34, 40, and 44, and the memory 50 are synchronized in the sense that the control tracks on the drums each contain an initial, single binary "1" "write here" mark which are coincidentally coupled to the respective drum reading heads once for each cycle of the memory 50. That this synchronization is possible directly follows from the integral 8 to 1 capacity relationship characterizing the memories in contiguous storage stages.

The first two information words supplied by the source 10 to the input lead(s) 11 during a data writing cycle are inserted into the register 20 under control of the coincidentally energized control leads 12. At the time the second information word is so supplied, pursuant to the first three rules given above, the full (2 bits) register 20 must be emptied into either the drum 30 or the lower input stage register 21. If the write here control mark on the drum 30 control track is detected at the associated drum reading head 31R when the second input word is produced by the source 10, hence indicating that the first one-eighth sector of the drum 30 is available for data inputting, the contents of the register 20 are translated to the drum 30. At the same time, the initial write here mark in the control track of the drum 30 is shifted two bit spacings by the mark generator 28 to indicate where the next information bits are to be placed. This data flow is effected by a closure of the contacts C (FIGS. 1 and 1A) by the FIG. 3 control circuitry considered hereinafter.

Correspondingly, if the drum 30 is not so oriented at this time, the contacts A are closed, and the two information bits flow into the register 21. The data remains in the register 21 until the drum 30 rotates to the proper data receiving position, which is detected by the control circuitry when the drum 30 reading head 31R detects the binary "1" write here digit in the control track. The information is then translated between the register 21 and the data tracks of the drum 30 via the contacts B. It is noted that at most .16 millisecond can elapse until the drum 30 attains an information-receiving status and, during this period, the source 10 can supply at most two input words. These data words may be directly inserted in the now empty upper input stage register 20.

The above-described mode of data processing continues eight times until the drum 30 is completely filled with information. At such a time, the drum 30 is in a functional state identically analogous to the aforediscussed full status for the input stage upper register 20. More particularly, the filled drum 30 will write directly into the first empty one-eighth sector of the middle stage upper drum 40 if the write here mark on the control track of the drum 40 is then coupled to the corresponding reading head 41R. The write here mark in the drum 40 is automatically shifted to the proper position when the contents of the drum 30 control track are written therein. If the drum 40 is not so rotationally oriented, the full drum 30 writes into the lower middle stage drum 34 which retains the information until the proper one-eighth sector of the following stage memory 40 is accessible.

The above circuit functioning continues until the drum 30 has, in turn, been filled eight times by the input stage registers 20 and 21. Following this, all eight sectors of the upper middle stage drum 40 are filled, and the memory 40 writes into the principle circulating memory 50, or into the drum 44 depending on whether or not the first one-eighth sector of the memory 50 is available at the writing head 51W, as determined from the position of the write here mark on the control track of the memory 50. Again, the above information processing recurs until the drum 40 has been filled by the drums 30 and 34 eight times, at which point the principal memory 50 is completely filled. This ends an information inputting cycle, and the stored data may be read from the memory 50 by the output circuit 80 via the reading head 51R on either a sequential or a periodic basis, as desired.

For the above-considered circuit functioning, it was assumed that the input source 10 supplied sufficient data to completely fill the principal memory 50 during a data inputting time interval. If this is not the case, the FIG. 1 storage arrangement is constrained by the associated control circuitry illustrated in FIGS. 2 and 3 to translate all the data which has been generated by the source 10 to the memory 50 after the write cycle terminates. More specifically, all partially full buffer memories are sequentially emptied in a left-to-right, bottom-to-top order until all available information has been closely packed in the memory 50. Then, as before, the now partially filled memory 50 may be interrogated by the output circuit 80 in a periodic or sequential manner.

Thus, the FIG. 1 arrangement has been shown by the above to accept data asynchronously supplied by the source 10, and to closely pack this information in the circulating memory 50.

Figure 2:
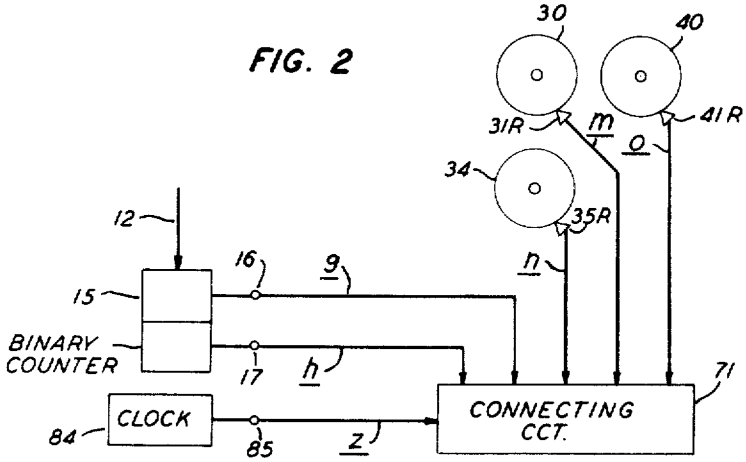
FIG. 2 is a diagram illustrating the control circuitry for three magnetic drums 30, 34 and 40 shown in FIG. 1.

An illustrative circuit arrangement for controlling a typical related set of connecting link contacts, i.e., the contacts D, E, and F between the middle and final buffering stages, is shown in FIG. 2. The arrangement comprises control information relating to the status of the data supplying stage memories, the status of the upper memory in the receiving stage, and the status of both memories in the preceding stage. This control information is respectively contained in the control tracks of the drums 30 and 34, the control track of the receiving drum 40, and in the state of a two-stage binary counter 15, which is advanced by pulses appearing on the input control lead 12. With respect to the counter 15, it is noted that the binary signals appearing at two output terminals 16 and 17 thereof selectively indicate whether or not data is presently stored in the registers 20 and 21.

A clock source 84 is included in the FIG. 2 arrangement and includes an output terminal 85 thereon which is continuously energized following the end of each write cycle. In addition, a connecting circuit 71 is adapted to receive digital control information from the clock output terminal 85, the two counter 15 output terminals 16 and 17, and the reading heads 31R, 35R and 41R which are respectively coupled to the control tracks of the drums 30, 34 and 40.

The connecting circuit 71 is a combinatoric logic arrangement which responds to a plurality of Boolean input variable in accordance with three output Boolean functions for selectively operating the switch contacts, D, E, and F shown in FIG. 1. More specifically, the contacts D, E, and F are closed when the corresponding combinatoric function shown below the circuit 71 in FIG. 2 is satisfied, wherein the Boolean variables represented by lower case letters in the functions correspond to signals whose source is identified by a like letter elsewhere in FIG. 2. Thus, for example, the Boolean variables $m$, $n$ and $o$ respectively identify binary signals which appear at the reading heads 31R, 35R and 41R coupled to the control tracks of the drums 30, 34 and 40. The circuit 71 may advantageously comprise any well-known combinatoric embodiment, such as electronic switching circuitry of the relay structures shown in chapter 4 of a text by S. H. Caldwell entitled "Switching Circuits and Logical Design," copyrighted in 1958 by John Wiley & Sons, Inc.

The Boolean functions D, E and F shown in FIG. 2 operate the corresponding contacts D, E and F in accordance with the rules and illustrative examples given above. The first expression in each function corresponds to a contact closure during the write cycle when data is still forthcoming from the source 10, while the second expression gives rise to a completed data path after the write cycle ends when all partially filled memories are sequentially emptied into the larger storage stages.

For example, the closure of the interstage contacts D is determined by the Boolean function $m \bar{n} o + z \bar{n} o \bar{g} \bar{h}$. The first expression is a "1," resulting in a closure of the contacts D, when the write here digit on the control track of the drums 30 and 40 are coincidentally coupled to the respective reading heads 31R and 41R ($m$ *and* $o$), thus indicating that the drum 40 is in a position to accept data while the drum 30 is full and therefore waiting to transmit information, *and* also when the drum 34 is not full ($\bar{n}$), and hence not in a data transmitting state. It is observed that the variables $m$, $n$ and $o$ attain digital "1" or "0" values when the write here control marks are, or are not coupled to the respective reading heads 31R, 35R and 41R.

In addition, the second expression in the above Boolean function, viz, $z \bar{n} o \bar{g} \bar{h}$ is a "1," and results in a closure of the contacts D, if the data inputting cycle has ended ($z$), and the binary counter 15 is in the "00" state ($\bar{g}$ *and* $\bar{h}$) indicating that the registers 20 and 21 have already been emptied *and* the drum 40 is oriented to receive information ($o$), *and* the drum 34 is empty ($\bar{n}$). Hence, the composite function D shown in FIG. 2 is operable to satisfy all the rules set forth above for proper functioning of the contacts D included in the FIG. 1 storage arrangement. Correspondingly, the Boolean functions E and F shown in FIG. 2 likewise satisfy the requirements for proper circuit operation of the FIG. 1 contacts E and F.

The control structure for selectively interconnecting the buffering magnetic drums 40 and 44 and the principal memory 50 is essentially identical to the organization shown in FIG. 2, and will not be considered further herein. The structure for regulating the data flow between the input buffering stage registers 20 and 21, and the drum 30 is shown in FIG. 3. An analysis paralleling that given above illustrates that the Boolean expressions for A, B, and C shown in FIG. 3 operate the corresponding FIG. 1 contacts A, B, and C in a manner to produce the desired data translation.

It is noted at this point that the operational rules enumerated above, together with the control circuitry for operating the storage arrangements in conformity with these rules, comprise only one of a plurality of possible modes of operation for the buffer memories and the principal circulating memory 50 shown in FIG. 1. For example, the leads 27, 37, and 47, together with the contacts C, D, and I respectively included therein, may be deleted from the FIG. 1 arrangement. In such an organization, data always flows from a full upper stage memory into the lower memory of the same stage, and then into the upper memory of the next stage. The attendant control structure is accordingly simplified since data always follows a like path, but the operational speed for the composite system is diminished. However, in any mode of operation, and independent of the particular control circuitry embodying the underlying operational rules, a plurality of synchronized buffer memory stages, including a plurality of memories bearing an integral or a common multiple capacity relationship are employed. It is noted that where a common multiple, rather than an integral capacity relationship is utilized, the control logic structure is increased in complexity, since memories in contiguous stages are mutually oriented for data translation only once during a plurality of rotations of the larger device.

The discussion hereinabove was principally directed to the circuit arrangement shown in FIG. 1 for connecting the asynchronous data source 10 to the principal circulating memory 50. Turning now to FIG. 4, there is shown a corresponding arrangement for connecting the principal memory 50 to an output circuit 90 which accepts data on an asynchronous basis. The arrangement is essentially the mirror image of the FIG. 1 structure, with left and right, and top and bottom being reversed. The structural correspondence between the elements included in the arrangements of FIGS. 1 and 4 is indicated by the unprimed and primed reference numerals respectively shown in the two figures. The data outputting organization of FIG. 4 operates in a manner directly inverse to the above description for the FIG. 1 system, with a closely packed principal or buffer memory sequentially unloading adjacent one-eighth sectors into a right adjacent smaller storage device. Subject to the above enumerated inversions, the aforegiven circuit description for the FIG. 1 arrangement is equally descriptive of the FIG. 4 data translation organization. Hence, no further discussion is directed thereto.

It is observed at this point that while two memories were included in each buffering stage in the FIG. 1 arrangement, any number might well have been employed, with data links selectively connecting the storage devices in each stage to each other and to the next buffering stage. The number of required stages is decreased as the number of memories per stage is increased, but the requisite control structure is increased in complexity.

Finally, it is noted that the number of buffering stages can also be truncated by making the periodic memories in any buffering stage shift registers, and directly connecting the input source 10 of FIG. 1 thereto while deleting all stages to the left thereof, i.e., all stages with smaller memories. For example, the registers 20 and 21 may be eliminated, and the drums 30 and 34 each replaced by a 16 bit shift register. The resulting buffering array will then function in a manner identically paralleling that given above for the FIG. 1 storage organization, with the 8 to 1 storage capacity ratio between contiguous buffering stages being preserved.

To summarize, an illustrative storage arrangement for closely packing asynchronously supplied input data in a sequential access memory comprises a plurality of cascaded periodic memory stages of different periodicities to connect a data input source to the sequential memory. An integral or common multiple relationship characterizes the relative capacities of the memories such that each storage arrangement is sequentially enabled to fill the next larger stage.

In addition, the above-described arrangement in inverted form may be employed to provide an interface between a sequential access memory and an asynchronous data output element.

It is to be understood that the above-described arrangements are only illustrative of the application of the principles of the present invention. Numerous other arrangements may be devised by those skilled in the art without departing from the spirit and scope thereof. For example, an interface between unsynchronized, asynchronous input and output sources may be effected by combining the arrangements shown in FIGS. 1 and 4.

Also, if acoustical delay lines are employed in place of the magnetic drums in the FIG. 1 organization, bit spacings of the order of nanoseconds may be obtained.

What is claimed is:

1. In combination, an asynchronous data source, a circulating memory characterized by a capacity of $m$ bits, where $m$ is a positive integer, and a plurality of cascaded intermediate storage stages connecting said source and said circulating memory, each of said intermediate storage stages comprising a plurality of like periodic memories of capacity $m/n$, where $n$ and $m/n$ are positive integers.

2. A combination as in claim 1 wherein the memories included in said storage stages monotonically increase in capacity from said source to said circulating memory.

3. A combination as in claim 2 further comprising a plurality of links for selectively connecting the memories in each stage to each other and to at least one memory of a contiguous stage, and switch means serially included in said links.

4. A combination as in claim 3 further comprising first control means responsive to any of said memories being full and to the first available sector of an associated larger memory being oriented for data inputting for activating said switch means to connect said memories via a selected one of said links.

5. A combination as in claim 4 further comprising additional control means responsive to any of said memories being full and to the associated contiguous stage memory being not oriented for data inputting for activating said switch means to connect said full memory to another memory in the same stage via a selected one of said links.

6. A combination as in claim 5 where the periodic memories included in the storage stage connected to said data source comprise shift registers.

7. A combination as in claim 6 where a plurality of said periodic memories and said circulating memory includes a control track and at least one data track, and further comprising means for selectively inserting control marks in said control tracks.

8. A combination as in claim 7 further comprising output utilization means connected to said circulating memory.

9. A combination as in claim 8 further comprising a plurality of reading and writing heads providing an interface between said links and said memories.

10. A combination as in claim 9 wherein each of said memories not connected to said data source comprise rotating magnetic drums.

11. In combination, asynchronous data output means, a circulating memory characterized by a capacity of *m* bits, where *m* is a positive integer, and a plurality of cascaded intermediate storage stages connecting said circulating memory and said output means, each of said intermediate storage stages comprising a plurality of like periodic memories of capacity $m/n$, where *n* and $m/n$ are positive integers.

12. A combination as in claim 11 wherein said periodic memories monotonically decrease in capacity from said circulating memory to said output means.

13. A combination as in claim 12 further comprising a plurality of links for selectively connecting the memories included in each storage stage to each other and to at least one memory included in a contiguous stage, and switch means serially included in said links.

14. In combination, a circulating memory characterized by a capacity of *m* bits, where *m* is a positive integer, and a plurality of cascaded buffer storage stages connected to said circulating memory, each of said buffer storage stages comprising a plurality of like periodic memories of capacity *n*, where *n* bears a common multiple relationship to *m*.

15. A combination as in claim 14 further comprising an input source connected to said buffer memories, and wherein the memories in said buffering stages monotonically increase in capacity from said input source to said circulating memory.

16. A combination as in claim 14 further comprising output means connected to said buffering stages, and wherein the memories included in said buffering stages monotonically decrease in capacity from said circulating memory to said output means.

17. In combination, an asynchronous data source, asynchronous data output means, a circulating memory, a first plurality of cascaded storage stages connecting said source and said circulating memory, and a second plurality of cascaded storage stages connecting said circulating memory and said output means.

18. A combination as in claim 17 wherein said first and second plurality of storage stages each comprises a plurality of like periodic memories.

19. A combination as in claim 18 wherein said periodic memories monotonically decrease in capacity in a direction away from said circulating memory.

References Cited

UNITED STATES PATENTS

| | | | |
|---|---|---|---|
| 2,902,679 | 9/1959 | De Phillipo et al. | 340—174 |
| 3,013,254 | 12/1961 | Walker | 340—172.5 X |
| 3,302,176 | 1/1967 | McLaughlin | 340—172.5 |

ROBERT C. BAILEY, *Primary Examiner.*

P. R. WOOD, *Assistant Examiner.*